US007889874B1

(12) United States Patent
Ayad

(10) Patent No.: US 7,889,874 B1
(45) Date of Patent: Feb. 15, 2011

(54) NOISE SUPPRESSOR

(75) Inventor: Beghdad Ayad, San Diego, CA (US)

(73) Assignee: Nokia Corporation, Espoo (FI)

( * ) Notice: Subject to any disclaimer, the term of this patent is extended or adjusted under 35 U.S.C. 154(b) by 1573 days.

(21) Appl. No.: 09/713,524

(22) Filed: Nov. 15, 2000

(30) Foreign Application Priority Data

Nov. 15, 1999 (FI) .................................. 19992453

(51) Int. Cl.
*H04B 15/00* (2006.01)

(52) U.S. Cl. .................... 381/94.2; 381/94.7; 381/94.1; 704/233

(58) Field of Classification Search ....... 381/94.1–94.3, 381/71.9, 94.7, 71.1, 110; 704/226–228, 704/233, 214
See application file for complete search history.

(56) References Cited

U.S. PATENT DOCUMENTS

| | | | | |
|---|---|---|---|---|
| 5,406,635 A | | 4/1995 | Jarvinen | 381/94 |
| 5,544,250 A | * | 8/1996 | Urbanski | 381/94.3 |
| 5,550,924 A | | 8/1996 | Helf et al. | |
| 5,706,395 A | | 1/1998 | Arslan et al. | 395/2.35 |
| 5,768,473 A | * | 6/1998 | Eatwell et al. | 704/226 |
| 5,943,429 A | * | 8/1999 | Handel | 381/94.2 |
| 5,963,901 A | * | 10/1999 | Vahatalo et al. | 704/233 |
| 6,088,668 A | * | 7/2000 | Zack | 704/225 |
| 6,445,801 B1 | * | 9/2002 | Pastor et al. | 381/94.2 |

FOREIGN PATENT DOCUMENTS

| | | |
|---|---|---|
| EP | 0918317 A1 | 5/1999 |
| JP | 9503590 | 4/1997 |
| JP | 10149198 | 6/1998 |
| JP | 11038998 | 2/1999 |
| JP | 2001092491 | 4/2001 |
| JP | 2001134287 | 5/2001 |
| WO | WO 95/15550 | 6/1995 |
| WO | WO 96/24128 | 8/1996 |
| WO | WO 97/22116 | 6/1997 |

OTHER PUBLICATIONS

Merriam-Webster's Collegiate Dictionary, 2000, Tenth Edition, p. 1116.*

"Suppression of Acoustic Noise in Speech Using Spectral Subtraction", Steven F. Boll, IEEE Transactions on Acoustics, Speech, and Signal Processing, vol. Assp-27, No. 2, Apr. 1979, pp. 113-121.

"The Use of Fast Fourier Transform for the Estimation of Power Spectra: A Method Based on Time Averaging Over Short, Modified Periodograms", Peter D. Welch, IEEE Transactions on Audio and Electroacoustics, vol. AU-15, No. 2, Jun. 1967, pp. 70-73.

(Continued)

*Primary Examiner*—Xu Mei
(74) *Attorney, Agent, or Firm*—Perman & Green LLP

(57) ABSTRACT

A method of suppressing noise in a signal containing speech and noise to provide a noise suppressed speech signal. An estimate is made of the noise and an estimate is made of speech together with some noise. The level of the noise included in the estimate of the speech together with some noise is variable so as to include a desired amount of noise in the noise-suppressed signal.

15 Claims, 5 Drawing Sheets

OTHER PUBLICATIONS

"A Signal Subspace Approach for Speech Enhancement", Ephraim et al., IEEE Transactions on Speech and Audio Processing, vol. 3, No. 4, 1995, pp. 251-266.

"Enhancement and Bandwidth Compression of Noisy Speech", Lim et al., Proceedings of the IEEE, vol. 67, No. 12, 1979, p. 1586-1604.

Gustafsson, et al., "A Postfilter For Echo And Noise Reduction Avoiding The Problem Of Musical Tones", Institute of Communication Systems and Data Processing, Aachen, Germany, IEEE 0-7803-5041-3/99, 1999, pp. 873-876.

Hansen, et al., Robust Estimation of Speech in Noisy Backgrounds Based on Aspects of the Auditory Process, Feb. 2, 1995, pp. 1-38, The Journal of Acoustical Society of America, vol. 97, Jun. 1995.

Bershad, et al., The Recursive Adaptive LMS Filter - A Line Enhancer Application and Analytical Model for the Mean Weight Behavior, Dec. 6, 1980, pp. 1-9, on Acoustics, Speech, and Signal Processing, vol. ASSP-28, No. 6, Dec. 1980.

Quatieri, et al., Noise Reduction Based on Spectral Change, pp. 1-4, MIT Lincoln Laboratory, Lexington, MA USA.

Tsoukalas, et al., Speech Enhancement Based on Audible Noise Suppression, pp. 1-18, IEEE Transactions on Speech and Audio Processing, vol., 5 No. 6, Nov. 1997.

Gustafsson, et al., A New Approach to Noise Reduction Based on Auditory Masking Effects, Sep. 2, 1998, pp. 1-5, Institute of Communication Systems and Data Processing, Aachen, Germany.

Gustaffson, et al., A Novel Psychoacoustically Motivated Audio Enhancement Algorithm Preserving Background Noise Characteristics, pp. 397-400, Aachen, Germany.

Gustaffson, et al., A Postfilter for Echo and Noise Reduction Avoiding the Problem of Musical Tones, pp. 873-876, Aachen Germany.

Gustaffson, S., Enhancement of Audio Signals by Combined Acoustic Echo Cancellation and Noise Reduction, Jun. 1999, 79 pages.

Japanese Office Action dated Sep. 29, 2010.

* cited by examiner

NOISE SUPPRESSOR

FIELD OF THE INVENTION

This invention relates to noise suppression and is particularly, but not exclusively, related to noise suppression in a speech signal picked up by a mobile terminal such as a mobile phone.

BACKGROUND OF THE INVENTION

When a communications terminal is used to make a record of or to transmit a speech signal containing speech, it is inevitable that its microphone will pick up environmental or background noise from the environment in which a speaking person is located. The background noise reduces the ability of a listener to hear or understand the speech and in some cases, if the noise level is sufficiently high, prevents the listener from hearing anything other than the background noise. In addition, such background noise may have a negative effect on the performance of digital signal processing systems in the communications terminal or in an associated communications network, such as speech coding or speech recognition. Typically, noise suppression systems are incorporated in communications terminals and communications networks to limit the effect of background noise.

Noise suppression has been well known for a number of years. Many different approaches and methods have been proposed to achieve three main ends:

(i) suppressing the noise significantly while preserving good speech quality;

(ii) rapid convergence to the optimal solution independent of the nature of the processed noise; and (iii) improving speech intelligibility for very low speech-to-noise (SNR) ratios.

One noise suppression method based on the linear Minimum Mean Squared Error (MMSE) criteria will be described with reference to FIG. 1. The method operates on a noisy speech signal x(t) containing a speech signal s(t) and a noise signal n(t) such that x(t)=s(t)+n(t). The noisy speech signal x(t) is in the time domain. It is converted into a sequence of frames having consecutive frame numbers k using a windowing function. The frames are then each transformed into the frequency domain using a Fast Fourier Transform (FFT) in block 10 so as to produce a sequence of noisy speech frames where noisy speech signal X(f,k) in the frequency domain contains a speech signal S(f,k) and a noise signal N(f,k) such that X(f,k)=S(f,k)+N(f,k). The frames in the frequency domain comprise a number of frequency bins f. In the frequency domain, the MMSE approach involves minimising the following error function:

$$\epsilon^2(f,k)=E\{(S(f,k)-\hat{S}(f,k))\cdot(S(f,k)-\hat{S}(f,k))^*\} \quad (1)$$

where E{•} is the expectation operator, (*) denotes complex conjugation and $\hat{S}$(f,k) represents a linear estimate of the input speech signal. The error $\epsilon^2$(f,k) defined by Equation 1 represents the squared difference between the true speech component contained within the noisy speech signal and the estimate of that speech component, $\hat{S}$(f,k), i.e. the estimate of the noise-free speech component. Thus, minimisation of $\epsilon^2$(f,k) is equivalent to obtaining the best possible estimate of the speech component. $\hat{S}$(f,k) is given by:

$$\hat{S}(f,k)=G(f,k)\cdot X(f,k) \quad (2)$$

where G(f,k) is a gain coefficient. The corresponding solution of the minimisation of $\epsilon^2$(f,k) for each frame takes the form of a computation of the gain coefficient G(f,k) which is multiplied by the associated input frequency bin of that frame to produce the estimated noise-free speech component $\hat{S}$(f,k). This gain coefficient, known as the frequency domain Wiener filter, is given by the ratio below:

$$G(f,k)=\frac{E\{S(f,k)\cdot X^*(f,k)\}}{E\{X(f,k)\cdot X^*(f,k)\}} \quad (3)$$

The Wiener filter G(f,k), is generated for each frequency bin f of each frame.

The noise-suppressed frames are then transformed back into the time domain in block 14 and then combined together to provide a noise suppressed speech signal $\hat{s}$(t). Ideally, $\hat{s}$(t)=s(t).

When deriving the Wiener filter, the MMSE approach is equivalent to the orthogonality principle. This principle stipulates that, for each frequency, the input signal X(f,k) is orthogonal to the error S(f,k)−$\hat{S}$(f,k). This means that:

$$E\{(S(f,k)-\hat{S}(f,k))\cdot X^*(f,k)\}=0 \quad (4)$$

Because the estimation process is linear, by estimating the signal component of a noisy signal that contains a signal component and a noise component, an estimate of the noise $\hat{N}$(f,k) is also effectively obtained. Furthermore, the following orthogonality relationship will also be true:

$$E\{(N(f,k)-\hat{N}(f,k))\cdot X^*(f,k)\}=0 \quad (5)$$

where $\hat{N}$(f,k) indicates the noise estimate. It also follows that for every frequency, the following equality applies:

$$S(f,k)-\hat{S}(f,k)=\hat{N}(f,k)-N(f,k) \quad (6)$$

that is, the error associated with the estimate of the noise component $\hat{N}$(f,k) is the same as the error associated with the estimated noise-free speech component $\hat{S}$(f,k).

In the remainder of this document, the following notation will be adopted: $P_{UV}$(f,k) is the cross power spectral density between U(f,k) and V(f,k) ($P_{UV}$(f,k)=E{U(f,k)·V*(f,k)}). $P_{UU}$(f,k) is the power spectral density (psd) of U(f,k) ($P_{UU}$(f,k)=E{U(f,k)·U*(f,k)}).

As a consequence of the above-mentioned orthogonality principle, it is possible to derive an expression for the cross psd $P_{SX}$(f,k), required in order to compute the Wiener filter described by Equation 3:

$$P_{SX}(f,k)=E\{(X(f,k)-\hat{N}(f,k))\cdot X^*(f,k)\} \quad (7)$$

Moreover, the cross psd $P_{NX}$(f,k) is given by:

$$P_{NX}(f,k)=E\{(X(f,k)-\hat{S}(f,k))\cdot X^*(f,k)\} \quad (8)$$

Having in mind the trivial equality $P_{XX}$(f,k)=$P_{SX}$(f,k)+$P_{NX}$(f,k), Equations 3, 6, 7 and 8 introduce and illustrate an idea of adaptive calculation since the Wiener filter ($P_{SX}$(f,k)/$P_{XX}$(f,k)) in Equation 3 depends on the estimated signal $\hat{S}$(f,k) (6,7) and (8).

When a minimum is reached, the expression describing the error in Equation 2 takes the following form:

$$\varepsilon^2_{\min}(f,k)=\frac{P_{SS}(f,k)\cdot P_{XX}(f,k)-|P_{SX}(f,k)|^2}{P_{XX}(f,k)} \quad (9)$$

It is evident that minimum error, that is $\epsilon_{min}^2$(f,k), is equal to zero only if the desired signal S(f,k) is completely coherent with the input signal X(f,k) (that is, $P_{NN}$(f,k) tends to zero).

This is desirable. Otherwise, there is an error when applying the Wiener filter. The upper limit of this error is $P_{SS}(f,k)$. This is undesirable. In other words, an error-free result can only be obtained if there is actually no noise in the input signal X(f,k). For any finite noise level, a finite error is obtained. It follows that the worst case error occurs when there is no speech signal S(f,k) in X(f,k).

SUMMARY OF THE INVENTION

According to a first aspect of the invention there is provided a method of suppressing noise in a signal containing noise to provide a noise suppressed signal in which an estimate is made of the noise and an estimate is made of speech together with some noise.

Preferably the signal comprises speech.

Preferably the level of the noise included in the estimate of the speech together with some noise is variable so as to include a desired amount of noise in the noise-suppressed signal.

Preferably the level of the noise provides an acceptable level of context information.

Preferably the level of the noise is below the mask limit of the speech and so is not audible to a listener. Alternatively the level of noise approaches the mask limit of the speech and so some noise context information is left in the signal.

Preferably the method does not suppress noise if the signal to noise ratio is sufficiently high so that the level of noise already provides an acceptable level of context information or is already below the mask limit.

Preferably the estimated noise is power spectral density.

According to a second aspect of the invention there is provided a method of producing a gain coefficient for noise suppression in which a first estimation of the gain coefficient is made adaptively and this first estimation is used to produce a noise estimation which is then used to produce a second estimation of the gain function.

In this respect, the invention provides an important advantage. It effectively eliminates the need for a Voice. Activity Detector (VAD) in a noise suppressor implemented according to the invention. A VAD is basically an energy detector. It receives a noisy speech signal, compares the energy of the filtered signal with a predetermined threshold and indicates that speech is present in the received signal whenever the threshold is exceeded. In many speech encoding/decoding systems, particularly in the field of mobile telecommunications, operation of the VAD changes the way in which background noise in a speech signal is processed. Specifically, during periods when no speech is detected, transmission may be cut and so-called "comfort noise" generated at the receiving terminal. Thus use of such discontinuous transmission and voice activity detection schemes may complicate the use of noise suppression and lead to unwanted effects. Elimination of the need for a voice activity detector and the creation of a noise suppression scheme that automatically adapts to changes in noise conditions is therefore highly desirable. Because the invention introduces a method of noise suppression in which an estimate of both speech and background noise is obtained, there is effectively no need to make a decision as to whether an input signal contains speech and noise or just noise. As a result the VAD function becomes redundant.

Preferably the first estimation is used to up-date the estimated noise.

According to other aspects of the invention, there is provided a noise suppressor operating according to the first aspect of the invention, a noise suppressor operating according to the second aspect of the invention, a noise suppressor operating according to the first and the second aspects of the invention, a communications terminal comprising a noise suppressor according to the first and/or second aspects of the invention and a communications network comprising a noise suppressor according to the first and/or second aspects of the invention.

Preferably the communications terminal is mobile. Alternatively, the invention may be used in a network or fixed communications terminal.

According to another aspect of the invention there is provided a method of calculating a Wiener filter in which an estimate is made of speech and background noise and the noise is far enough below the speech so that it is wholly or partially masked below the audible level or perception of a user.

Preferably the method is for noise suppression in the frequency domain. It may comprise calculating the numerator and denominator of a Wiener filter to be used for a noise reduction system. The noise suppression system described in this document is particularly suitable for application in a system comprising a single sensor such as a microphone.

Preferably the filter is a Wiener Filter. Preferably it is based on an estimate of a periodogram comprising a combination of speech and noise. Preferably the method involves continuous up-dating of noise psd.

BRIEF DESCRIPTION OF THE DRAWINGS

An embodiment of the invention will now be described by way of example only with reference to the accompanying drawings in which.

DETAILED DESCRIPTION

In the following the symbol P generally represents power. Where it is primed, that is P', it represents a periodogram and where it is not primed, that is P, it represents a power spectral density (psd). In accordance with their generally accepted meanings, the term "periodogram" is used to denote an average calculated over a short period and the term power spectral density is used to represent a longer term average.

Figure 1:
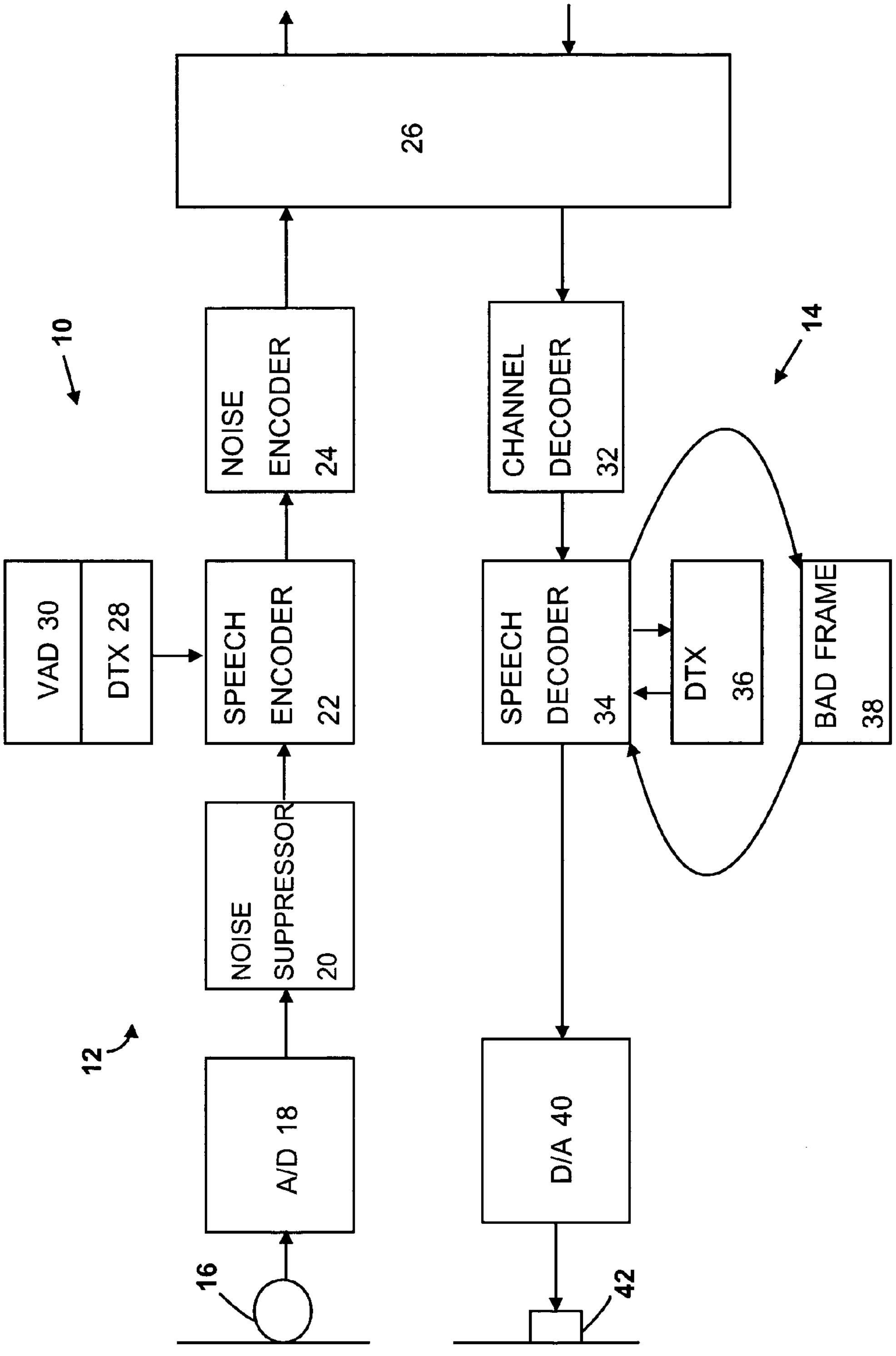
FIG. 1 shows a mobile terminal according to the invention.

An embodiment of a mobile terminal 10 comprising a noise suppressor 20 according to the invention will now be described with reference to FIG. 1. FIG. 1 corresponds to an arrangement of a mobile terminal according to the prior art although such prior art terminals comprise conventional prior art noise suppressors. The mobile terminal and the wireless communications system with which it communicates operate according to the Global System for Mobile telecommunications (GSM) standard.

The mobile terminal 10 comprises a transmitting (speech encoding) branch 12 and a receiving (speech decoding) branch 14. In the transmitting (speech encoding) branch 12, a speech signal is picked up by a microphone 16 and sampled by an analogue-to-digital (A/D) converter 18 and noise suppressed in the noise suppressor 20 to produce an enhanced signal. This requires the spectrum of the background noise to be estimated so that background noise in the sampled signal can be suppressed. A typical noise suppressor operates in the frequency domain. The time domain signal is first transformed into the frequency domain which can be carried out efficiently using a Fast Fourier Transform (FFT). In the frequency domain, voice activity is distinguished from background noise and when there is no voice activity, the spectrum of the background noise is estimated. Noise suppression gain coefficients are then calculated on the basis of the current input signal spectrum and the background noise estimate. Finally, the signal is transformed back to the time domain using an inverse FFT (IFFT).

The enhanced (noise suppressed) signal is encoded by a speech encoder 22 to extract a set of speech parameters which are then channel encoded in a channel encoder 24, where redundancy is added to the encoded speech signal in order to provide some degree of error protection. The resultant signal is then up-converted into a radio frequency (RF) signal and transmitted by a transmitting/receiving unit 26. The transmitting/receiving unit 26 comprises a duplex filter (not shown) connected to an antenna to enable both transmission and reception to occur.

A noise suppressor suitable for use in the mobile terminal of FIG. 1 is described in published document WO97/22116.

In order to lengthen battery life, different kinds of input signal-dependent low power operation modes are typically applied in mobile telecommunication systems. These arrangements are commonly referred to as discontinuous transmission (DTX). The basic idea in DTX is to discontinue the speech encoding/decoding process in non-speech periods. Typically, some kind of comfort noise signal, intended to resemble the background noise at the transmitting end, is produced as a replacement for actual background noise.

The speech encoder 22 is connected to a transmission (TX) DTX handler 28. The TX DTX handler 28 receives an input from a voice activity detector (VAD) 30 which indicates whether there is a voice component in the noise suppressed signal provided as the output of noise suppressor block 20. If speech is detected in a signal, its transmission continues. If speech is not detected, transmission of the noise suppressed signal is stopped until speech is detected again.

In the receiving (speech decoding) branch 14 of the mobile terminal, an RF signal is received by the transmitting/receiving unit 26 and down-converted from RF to base-band signal. The base-band signal is channel decoded by a channel decoder 32. If the channel decoder detects speech in the channel decoded signal, the signal is speech decoded by a speech decoder 34.

The mobile terminal also comprises a bad frame handling unit 38 to handle bad, that is corrupted, frames.

The signal produced by the speech decoder, whether decoded speech, comfort noise or repeated and attenuated frames is converted from digital to analogue form by a digital-to-analogue converter 40 and then played through a speaker or earpiece 42, for example to a listener.

Figure 2:
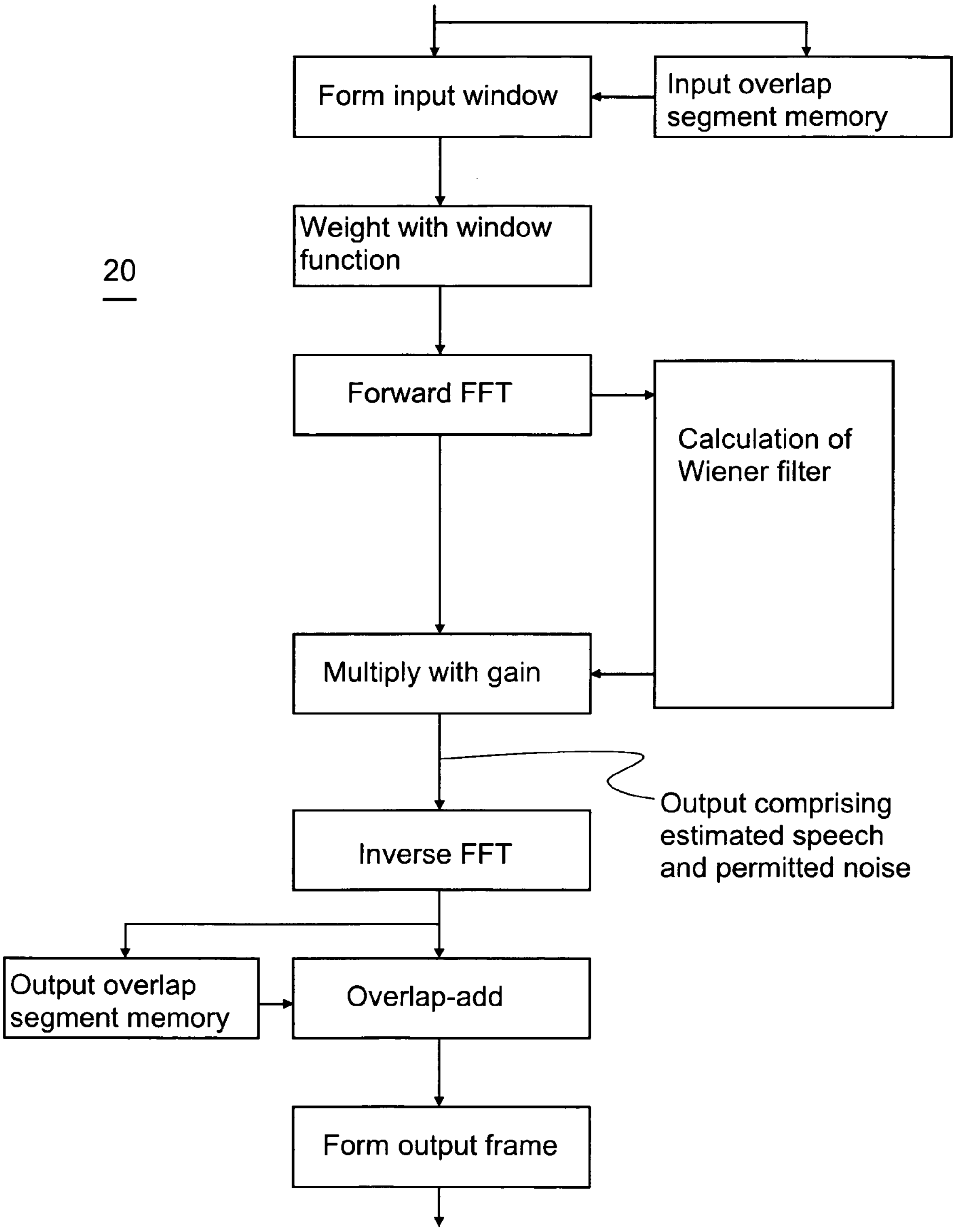
FIG. 2 shows a noise suppressor according to the invention.

Further details of the noise suppressor 20 are shown in FIG. 2. It comprises a Fast Fourier Transform, a gain coefficient or Wiener filter calculation block and an Inverse Fast Fourier Transform. Noise suppression is carried out in the frequency domain by multiplying frames by gain coefficients/Wiener filters.

The operation of the noise suppressor 20 will now be described. According to the invention, rather than attempting to estimate the "true" speech component S(f,k) in a noisy speech signal, a Wiener filter is used to estimate a combination of speech and a certain amount of noise according to the relationship S(f,k)+ξ·N(f,k). The modified Wiener filter thus created takes the form:

$$G(f,k) = \frac{P_{(S+\xi\cdot N)X}(f,k)}{P_{XX}(f,k)} = \frac{P_{SX}(f,k)+\xi\cdot P_{NX}(f,k)}{P_{SX}(f,k)+P_{NX}(f,k)} \quad (10)$$

Assuming that the speech and noise component are uncorrelated (that is, the cross psd between the speech and noise components must be equal to zero, $P_{SN}$(f,k)=0), Equation 10 can be re-expressed in the form:

$$G(f,k) = \frac{P_{SS}(f,k)+\xi\cdot P_{NN}(f,k)}{P_{SS}(f,k)+P_{NN}(f,k)} \quad (11)$$

The role of the factor ξ is explained below.

As explained earlier, the main advantage of estimating a combination of speech and a certain amount of noise is that there should be less error associated with the estimation. This benefit becomes further apparent in connection with Equation 12, presented below, which defines the minimum error obtained in this situation:

$$\varepsilon_{min}^2(f,k) = (1-\xi)^2\cdot\frac{P_{SS}(f,k)\cdot P_{NN}(f,k)}{P_{SS}(f,k)+P_{NN}(f,k)} \quad (12)$$

It can now be understood that as $P_{NN}$(f,k) tends to zero, equation 12 tends to zero and so the error tends to zero as in the case of the prior art. In common with the prior art, this is desirable. However, since Equation 12 includes the factor of $(1-\xi)^2$ it reaches zero more quickly than in the case of the prior art. On the other hand, as $P_{NN}$(f,k) increases, $\epsilon_{min}^2$ tends to $(1-\xi)^2\cdot P_{SS}$(f,k). In common with the prior art, this is undesirable. However, the error provided by the method according to the invention is always smaller than that provided by the prior art method described earlier. This advantage arises because the multiplying factor $(1\xi)^2$ always serves to reduce the amount of error. Furthermore, the factor $(1-\xi)^2$ can be minimised by setting ξ to an appropriate value, in which case the error is further minimised.

In the invention it has been recognised that the value of ξ can be determined to achieve the following results:

1. To provide a value of the product $\xi\cdot P_{NN}$(f,k) which is "masked" by $P_{SS}$(f,k). Even though an estimate of combined speech and noise is computed, a listener will hear only speech because the product $\xi\cdot P_{NN}$(f,k) will be below his audible level of perception. In this way, advantage is taken of the properties of the human auditory system, allowing the speech periodogram to be calculated together with the maximum of masked noise periodogram. When ξ is being applied to achieve this result, it is referred to as $\xi_1$.

Figure 3:
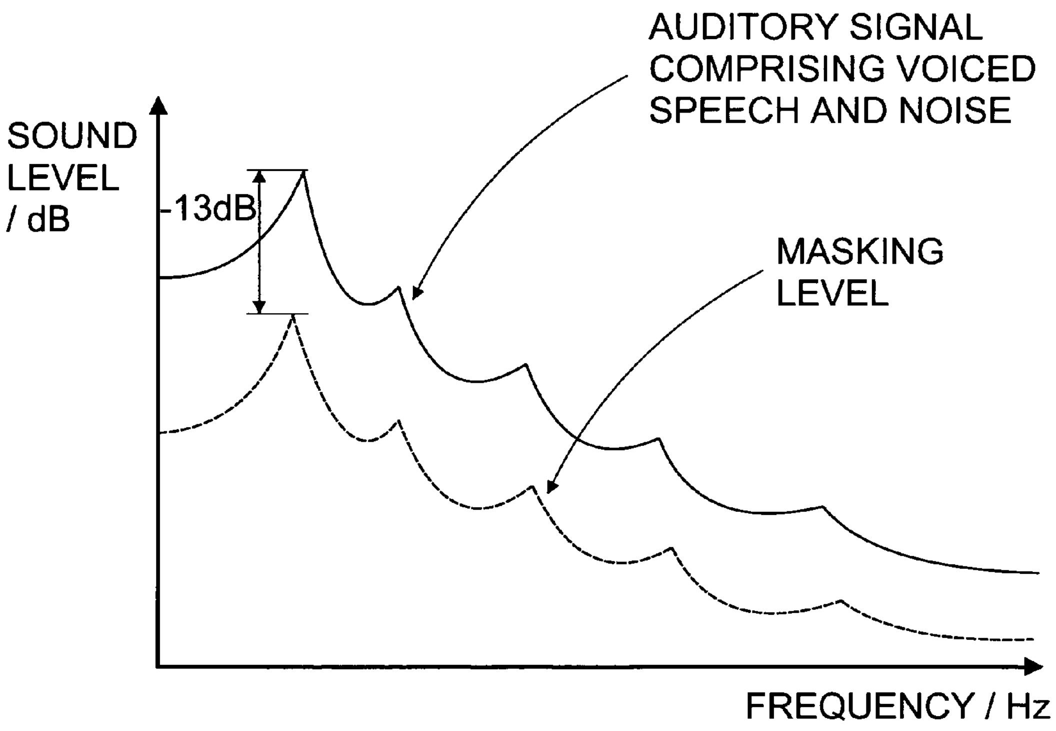
FIG. 3 shows the frequency and sound level dependent masking effect of the human auditory system

The "masking" effect is a property of the human auditory system which effectively sets a frequency dependent and sound level dependent lower limit or threshold on auditory perception. Thus, any noise or speech components below the masking threshold will not be perceived (heard) by the listener. It is generally accepted that the masking threshold is approximately 13 dB below the current input level, irrespective of frequency. This is illustrated in FIG. 3. According to the invention, in order to estimate the pure speech signal (that is, when trying to eliminate all the background noise), it is sufficient to estimate the pure speech signal together with that part of the noise just below the masking threshold.

2. To allow the level for noise reduction at the output to be freely chosen. This can be used to restore near-end context to the signal for the far-end listener. When $\xi$ is being applied to achieve this result, it is referred to as $\xi_2$. This means that $\xi$ may be chosen in such a way as to ensure adequate noise suppression, but also to permit a certain noise component to remain in the signal at the receiving terminal, such that the background noise appears to naturally represent the background noise present in the environment of a transmitting terminal. In other words it is possible to choose a value of $\xi$ such that the noise component in a noisy speech signal is not completely eliminated due to the masking effect.

In practical situations, speech signals are non-stationary and therefore require short-term estimation. Thus, instead of using psd functions, as shown in Equation 11, certain terms are replaced with periodograms. Noise may be also non-stationary, but it is generally considered to be stationary, so long-term estimation may be still be used. Hence, the form of the desired Wiener filter is:

$$G(f,k) = \frac{P'_{SS}(f,k) + \xi \cdot P'_{NN}(f,k)}{P'_{SS}(f,k) + \xi \cdot P_{NN}(f,k)} \tag{13}$$

It should be noted that it is also possible to use the background noise power spectral density term $P_{NN}(f,k)$ in the denominator of Equation 13. It should also be appreciated that when $\xi=\xi_1$ is used in Equation 13 above, the term $P_{SS}'(f,k)+\epsilon_1 \cdot P_{NN}'(f,k)$ represents a combination of the speech periodogram and the masked noise periodogram and when $\xi=\xi_2$ is used, the term $P_{SS}'(f,k)+\xi_2 \cdot P_{NN}'(f,k)$ represents a combination of the speech periodogram and the permitted noise periodogram. The denominator $P_{SS}'(f,k)+P_{NN}(f,k)$ is composed of the speech periodogram and the noise psd, respectively.

Calculation of the Wiener filter for a current frame k is based on a previous frame k−1 as follows. The noise psd $P_{NN}(f,k-1)$, the speech periodogram $P_{SS}(f,k-1)$ and the number of frames T(f,k−1) for time averaging of previous frames are known. For the current frame k, a combination of the input speech and the noise periodogram $|X(f,k)|^2$ is also known. Rather than $P_{NN}(f,k-1)$, $R_{NN}(f,k-1)$ or $L_{NN}(f,k-1)$ may be used if square root or logarithmic measures are employed, as described later in this description.

Figure 4:
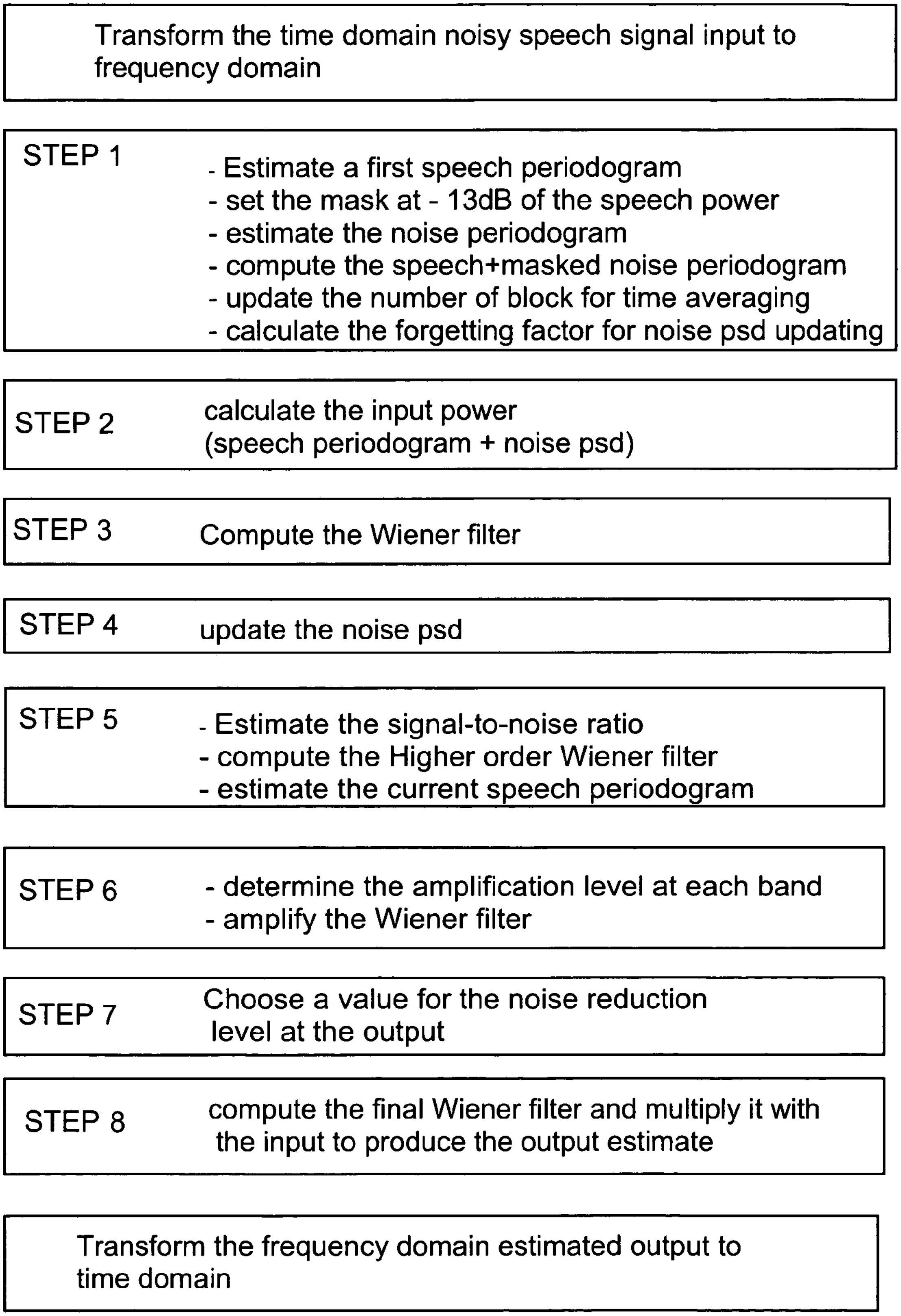
FIG. 4 shows a block diagram of an algorithm according to the invention.

An eight-step algorithm is used to calculate the Wiener filter. The eight steps are shown in FIG. 4 and are described below.

Step 1: Estimation of a Combination of the Speech and the Noise Periodogram $\overline{P}_{SS}(f,k)$ This periodogram is calculated as follows:

$$\overline{P}_{SS}'(f,k)=\alpha \cdot P_{SS}'(f,k-1)+(1-\alpha)\cdot|X(f,k)|^2 \tag{14}$$

It should be noted that $\overline{P}_{SS}'(f,k)$ is based on the previous periodogram of speech $P_{SS}'(f,k-1)$ and an amount of the current noisy speech signal $|X(f,k)|^2$, determined by a factor $\alpha$. The value of $\alpha$ is chosen to provide the greatest possible contribution from the current speech component $|S(f,k)|^2$ of the noisy speech SIGNAL $|X(f,k)|^2$, but it is limited to ensure that the factor $(1-\alpha)\cdot|N(f,k)|^2$, which represents the amount of the current noise signal that will be included, is masked by the sum $\alpha \cdot P_{SS}'(f,k-1)+(1-\alpha)\sim|S(f,k)|^2$ which represents an estimate of the current speech periodogram. Therefore, it should be appreciated that it is necessary to re-calculate the forgetting factor $\alpha$ for every frequency bin f of every frame k.

It should also be noted that the factor $(1-\alpha)$ referred to in Equation 14 is analogous to $\xi_1$.

Practically, step 1 is implemented by first estimating the current speech periodogram using the spectral subtraction method described in "*Suppression of Acoustic Noise in Speech Using Spectral Subtraction*", IEEE Trans. On Acoustics Speech and Signal Processing, vol. 27, no. 2, pp. 113-120, April 1979. Then the masking level is set at a value which is approximately 13 dB below the estimated speech periodogram level. The noise periodogram is estimated in same way as the speech periodogram. The value of $\alpha$ is then computed using the mask, the noise periodogram and the input periodogram.

Step 2: Estimation of a Combination of Speech and Noise Psd $\overline{P}_{XX}(f,k)$ This psd represents the total power of the input and is estimated by:

$$\overline{P}_{XX}(f,k) = \alpha\cdot\left[P'_{SS}(f,k-1)+\frac{\lambda}{\alpha}P_{NN}(f,k-1)\right]+(1-\alpha)\cdot|X(f,k)|^2 \tag{15}$$

This psd combines short term averaging (a periodogram for speech) together with long term averaging (a psd for noise).

Step 3: Estimation of the Wiener Filter

The Wiener filter of Equation 11 can be re-written in the following form:

$$G_1(f,k) = \frac{\overline{P}'_{SS}(f,k)}{\overline{P}_{XX}(f,k)} \tag{16}$$

and so can be calculated from the results of Equations 14 and 15. Since $\hat{S}_1(f,k)=G_1(f,k)\cdot X(f,k)$, it should be understood that the estimated speech $\hat{S}_1(f)$ contains the speech and the masked part of the noise. The minimum value for the gain $G_1(f,k)$ is set to $(1-\alpha)$.

Step 4: Updating of the Noise Psd $P_{NN}(f,k)$

To update the noise psd, the theoretical result presented in Equation 8 is used, replacing the product $(X(f,k)-\hat{S}(f,k))\cdot X^*(f,k)$ with the product $(1-G_1(f,k))\cdot|X(f,k)|^2$ where necessary. The following three methods can be used:

(i) power psd estimation;

(ii) square root psd estimation; and (iii) logarithm psd estimation.

In all of the methods described below, $\lambda$ represents a forgetting factor between 0 and 1.

(i) Power Psd Estimation

This method uses the orthogonality principle and is based on the Welch method described in "The Use of Fast Fourier Transform for the Estimation of Power Spectra: A Method Based on Time Averaging Over Short, Modified Periodograms", IEEE Trans. On Audio and Electroacoustics, vol. AU-15, n. 2, pp. 70-73, June 1967. It uses a technique known as "exponential time averaging", according to which:

$$P_{NN}(f,k)=\lambda\cdot P_{NN}(f,k-1)+(1-\lambda)\cdot(1-G_1(f,k))\cdot|X(f,k)|^2 \tag{17}$$

where $G_1(f,k)$ is the Wiener filter calculated according to equation 16.

(ii) Square Root Psd Estimation

This method uses a modification of the Welch method and is based on amplitude averaging:

$$\begin{cases} R_{NN}(f,k) = \lambda \cdot R_{NN}(f,k-1) + (1-\lambda) \cdot \sqrt{(1G_1(f,k))} \cdot |X(f,k)| \\ P_{NN}(f,k) = R_{NN}(f,k) \cdot R_{NN}(f,k) \end{cases} \quad (18)$$

$R_{NN}$(f,k) represents an average noise amplitude.

(iii) Logarithmic Psd Estimation

This method uses time averaging in the logarithm domain:

$$\begin{cases} L_{NN}(f,k) = \lambda \cdot L_{NN}(f,k-1) + (1-\lambda) \cdot \mathrm{Log}[(1-G_1(f,k)) \cdot |X(f,k)|^2] \\ P_{NN}(f,k) = R_{NN}(f,k) \cdot R_{NN}(f,k) \end{cases} \quad (19)$$

$L_{NN}$(f,k) refers to an average in the logarithmic power domain. γ is Euler's constant and has a value of 0.5772156649.

In each of the three methods described above, the forgetting factor λ plays an important role in the updating of the noise psd and is defined to provide a good psd estimation when noise amplitude is varying rapidly. This is done by relating λ to differences between the current input periodogram $|X(f,k)|^2$ and the noise psd $P_{NN}$(f,k−1) in the previous frame. λ depends on a value T(f,k) which defines the number of frames used for time averaging and is determined as follows:

$$\begin{cases} \text{if } |X(f,k)|^2 > 10 \cdot P_{NN}(f,k-1) & T(f,k) = 5 \\ \textit{elseif} \, |X(f,k)|^2 < 0.1 \cdot P_{NN}(f,k-1) & T(f,k) = 5 \\ \text{else} & T(f,k) = \mathrm{Min}[T(f,k-1)+1, 20] \end{cases} \quad (20)$$

and λ is derived from T(f,k) as follows:

$$\lambda = \frac{T(f,k)}{T(f,k)+1} \quad (21)$$

It should be noted that it is necessary to re-calculate the forgetting factor λ for each frame k and for every frequency bin f. Clearly, as λ is required in step 2, it needs to be calculated so that it is available for that step. It should also be appreciated that because the noise psd is updated continuously, this removes the need to have a voice activity detector in the noise suppressor 20.

Step 5: Estimation of Current Speech Periodogram $P_{SS}$'(f, k)

The current speech periodogram $P_{SS}$'(f,k) plays an important role in the algorithm. It is estimated for a current frame so that it can be used in a next frame, that is in Equations 14 and 15. As explained below, $P_{SS}$'(f,k) should only contain speech and should not contain any noise.

Effectively, after obtaining an estimate of speech amplitude Ŝ(f,k) in step 3, this step requires estimation of $P_{SS}$'(f,k) which represents the current speech periodogram.

It is widely accepted that $P_{SS}$'(f,k) can simply be replaced with the squared estimated speech amplitude, that is: $P_{SS}$'(f, k)=$|\hat{S}(f,k)|^2$ estimate of $|S(f,k)|^2$. Unfortunately, a good estimate Ŝ(f,k) does not actually imply that a good estimate for $|S(f,k)|^2$ can be obtained by simply taking the square. Thus, the method according to the invention seeks to obtain a more accurate estimate $P_{SS}$'(f,k) of $|S(f,k)|^2$ by applying the MMSE criterion.

Examining the combined speech and noise periodogram, it can be seen that:

$$Y(f,k) = |X(f,k)|^2 = |S(f,k)|^2 + |N(f,k)|^2 + S^*(f,k) \cdot N(f,k) + S(f,k) \cdot N^*(f,k).$$

Thus a good estimate of $|S(f,k)|^2$ may be obtained by minimising the following error (MMSE criterion):

$$\chi^2(f,k) = E\{||S(f,k)|^2 - H(f,k) \cdot Y(f,k)|^2\} \quad (22)$$

where H(f,k)·$|X(f,k)|^2$ represents an estimate of the speech periodogram $|S(f,k)|^2$.

Direct solution of Equation 22 requires solution of higher order equations, but the solution can be simplified by assuming that the speech and noise are Gaussian processes, uncorrelated with zero means, to provide an approximation of the corresponding Higher Order Wiener filter H(f,k). The approximation used in this method is presented in Equation 23 below. (It should be appreciated that different approximations may be used at this stage without departing from the essential features of the inventive principle).

$$H(f,k) = \frac{3 \cdot SNR(f,k) \cdot SNR(f,k) + SNR(f,k)}{3 \cdot SNR(f,k) \cdot SNR(f,k) + 6 \cdot SNR(f,k) + 3} \quad (23)$$

Here, SNR(f,k) refers to the signal-to-noise ratio and is calculated as follows:

$$SNR(f,k) = \frac{g_1(f,k)}{1 - G_1(f,k)} \quad (24)$$

Equation 24 is the reciprocal of a well-known function relating the Wiener filter and the signal-to-noise ratio. (Wiener=SNR/(SNR+1))

Consequently, the speech periodogram is calculated as follows:

$$P_{SS}'(f,k) = H(f,k) \cdot |X(f,k)|^2 \quad (25)$$

Step 6: The Amplification Function

In conditions of high SNR, when the speech component of the noisy input signal is large compared with the noise component, the estimated Wiener filter $G_1(f,k)$ tends to 1. Furthermore, when the speech to noise ratio is high, $G_1(f,k)$ can be estimated comparatively accurately. Thus, there is a good degree of certainty that the Wiener filter determined in Step 3, offers optimal filtering and provides an output containing a highly accurate estimate of the speech $\hat{S}_1(f)$ with a residual amount of (masked) noise. As the gain of the filter is close to 1 in this situation, it is advantageous to provide a small amount amplification to bring the gain still closer to 1. However, the additional amplification should also be limited to ensure that Wiener filter gain does not exceed 1 in any circumstance.

On the other hand in conditions where the speech component in the noisy input signal is small compared with the noise component, the opposite is true. The Wiener filter gain is small, and it is likely that $G_1(f,k)$ cannot be determined as accurately as in conditions of high SNR. In this situation, it is not so advantageous to amplify the Wiener filter output and the estimated Wiener filter should be maintained in the form it was originally estimated in step 3.

To take into account these two contradictory requirements that exist in different SNR conditions, the Wiener filter determined in step 3 is modified according to:

$$G_a(f,k)=G_1(f,k)^{Min[Kb(f),1-G_1(f,k)]} \quad (26)$$

to produce a Wiener filter $G_a(f,k)$ to be used in estimation of the final output. $G_a(f,k)$ is a function of $G_1(f,k)$.

Equation 26 exploits the fact that a function such as $y=x^{1-x}(x>0)$ provides amplification when x is less than one. It therefore fulfils the requirement of providing more amplification in good SNR conditions and less amplification in conditions of low SNR.

The variable Kb(f) can take values between 0 and 1 and is included in the exponent of Equation 26 in order to enable the use of different (e.g. predetermined) amplification levels for different frequency bands f, if desired.

Step 7: Selection of the Level of Noise Reduction

In this step, the desired level of noise reduction is selected. For the Wiener filter given in Equation 11, the corresponding ideal temporal output has the form $\hat{s}(t)=s(t)+\xi\cdot n(t)$. Recalling that the noisy input signal has the form $x(t)=s(t)+n(t)$, the noise reduction provided by the filter is theoretically about $20\cdot\log[\xi]$ dB. This result can be justified by considering the ratio of the noise level in the input signal to that in the output signal (i.e. the signal obtained after noise suppression). This ratio is simply $\xi\cdot n(t)/n(t)$, which, when expressed as a power ratio in decibels, becomes $20\cdot\log[\xi]$ dB. Consequently, the factor $0<\xi<1$ corresponds to the noise reduction introduced by the filter.

Having chosen a desired noise reduction level and determined the value of $\xi$ necessary to achieve that noise reduction (e.g. for −12 dB noise reduction, $\xi=0.25$), a factor $\eta$ is determined such that:

$$G_1(f,k)+\eta\cdot(1-G_1(f,k))\Leftrightarrow\frac{P_s(f,k)+\xi\cdot P_n(f,k)}{P_s(f,k)+P_n(f,k)}. \quad (27)$$

Equation 27 presents a way of relating a Wiener filter optimised to provide an output that includes only masked noise to a Wiener filter that provides an output including a certain amount of permitted noise. According to steps 1-3, the Wiener filter $G_1(f,k)$ is constructed so as to provide an estimate of the speech component of a noisy speech signal plus an amount of noise which is effectively masked by the speech component. Thus, in the condition where a certain amount of noise is permitted (desired) in the output, the Wiener filter must be modified accordingly. In Equation 27, $G_1(f,k)$ represents the Wiener filter optimised in step 3 to provide an output that contains speech-masked noise. The term $$\frac{P_s(f,k)+\xi\cdot P_n(f,k)}{P_s(f,k)+P_n(f,k)}$$

represents a Wiener filter that provides an amount of noise reduction $\xi$, which produces an output signal containing speech and a desired/permitted amount of noise. The term $\eta\cdot(1-G_1(f,k))$ thus represents an amount of non-masked noise and is essentially the difference between $$\frac{P_s(f,k)+\xi\cdot P_n(f,k)}{P_s(f,k)+P_n(f,k)}$$

and $G_1(f,k)$. Taking into account the fact that $G_1(f,k)$ contains noise at a level of about $(1-\alpha)$ times the noise present in the original noisy speech signal, the following relationship between $\alpha$, $\eta$, and $\xi$ is true:

$$1-\alpha+\eta\cdot\alpha\Leftrightarrow\xi \quad (28)$$

Step 8: Estimation of the Final Estimated Wiener Filter

Using Equations 16, 26 and 28, the final Wiener filter G(f,k) to be applied to the input is given by:

$$\begin{cases}\text{if } \alpha>(1-\xi) & \eta=\dfrac{\alpha+\xi-1}{\alpha}\\ \text{else} & \eta=0\\ G(f,k)=G_a(f,k)+\eta\cdot(1-G_1(f,k)) & \end{cases} \quad (29)$$

Although $\eta$ depends on $\alpha$, and has a different value for each frequency bin f of each frame k, the overall noise reduction level is maintained constant around $20\cdot\log[\xi]$ dB.

Alternatively, steps 1 to 8 could be implemented using formulae involving signal-to-noise ratio formulas. In the detailed implementation of steps 1-8, presented above, the discussion was based on calculations of noise psd functions, speech periodograms and input power (periodogram+psd). However, an alternative representation can be obtained by dividing Equation 11 and/or Equation 13 by the noise psd. This alternative representation requires estimation of a (signal+masked noise)-to-noise ratio, instead of a speech periodogram.

Figure 5:
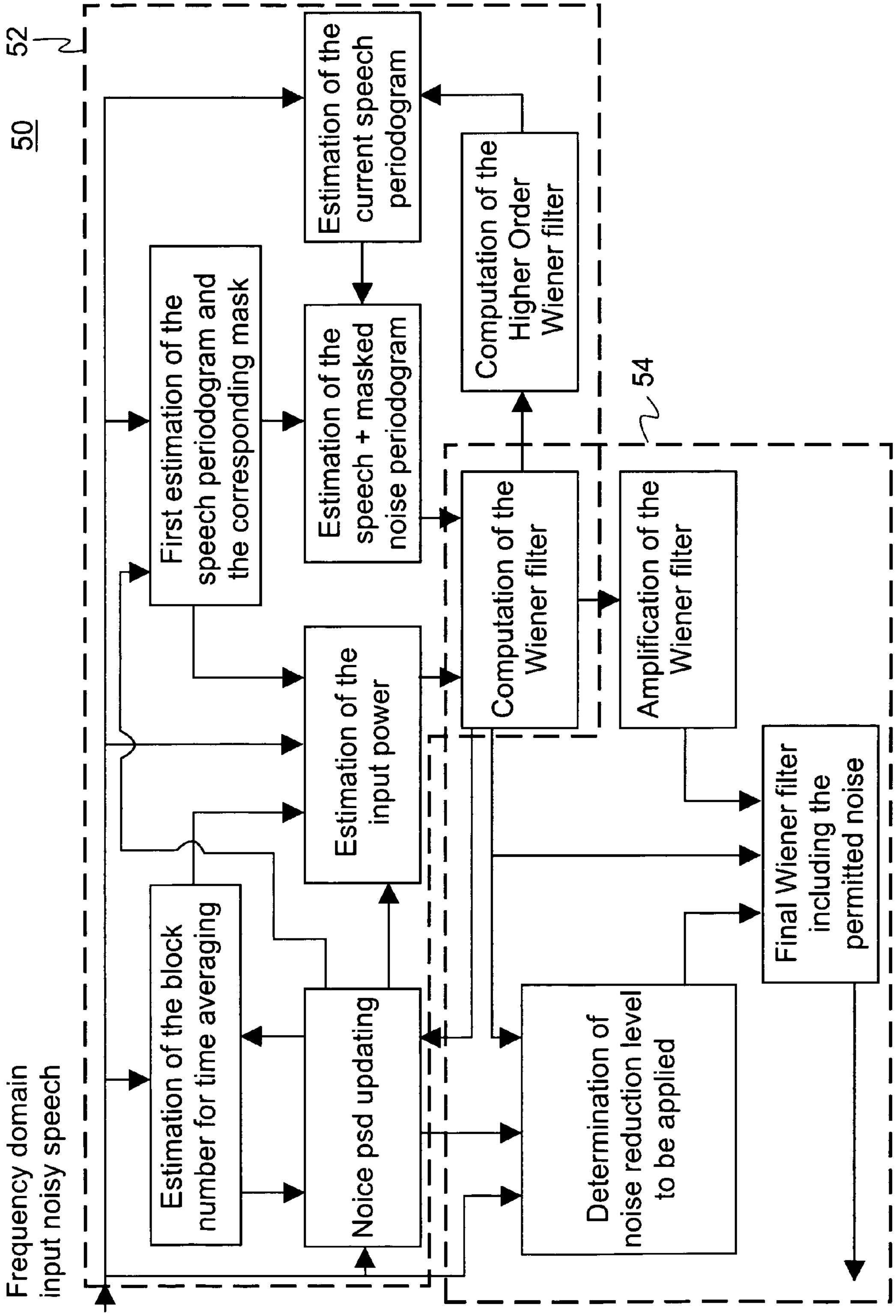
FIG. 5 shows a functional block diagram of an algorithm according to the invention.

An algorithm 50 embodying the invention is shown in FIG. 5. The algorithm 50 is shown divided into a set of steps 52 which are an adaptive process and a set of steps 54 which are a non-adaptive process. The adaptive process uses a computation of the Wiener filter to re-compute the Wiener filter. Accordingly, the step of the computation of the Wiener filter is common both to the adaptive process and to the non-adaptive process.

This Wiener filter calculation is also suitable for minimising the residual echo in a combined acoustic echo and noise control system including one sensor and one loudspeaker.

While preferred embodiments of the invention have been shown and described, it will be understood that such embodiments are described by way of example only. For example, although the invention is described in a noise suppressor located in the up-link path of a mobile terminal, that is providing noise suppressed signal to a speech encoder, it can equally be present in a noise suppressor in the down-link path of a mobile terminal instead of or in addition to the noise suppressor in the up-link path. In this case it could be acting on a signal being provided by a speech decoder. Furthermore, although the invention is described in a mobile terminal, it can alternatively be present in a noise suppressor in a communications network whether used in relation to a speech encoder or a speech decoder.

Numerous variations, changes and substitutions will occur to those skilled in the art without departing from the scope of the present invention. Accordingly, it is intended that the following claims cover all such equivalents or variations as fall within the spirit and scope of the invention.

The invention claimed is:

1. A method for suppressing noise in an audio signal comprising a speech component and a noise component to provide a noise suppressed audio signal, the method comprising:

causing an apparatus to make a frequency domain estimate of the noise component and a frequency domain estimate of the speech component together with a predetermined fraction of the noise component;

using the estimates in the apparatus to generate a noise reducing filter having a frequency-dependent gain function to control a gain of the audio signal to suppress the noise component, wherein a first estimation of the frequency-dependent gain function is made adaptively in the apparatus and the first estimation is used to produce a noise estimation which is then used in the apparatus to produce a second estimation of the frequency-dependent gain function.

2. The method according to claim 1, in which the predetermined fraction of the noise component is chosen so as to provide a desired amount of noise in the noise suppressed audio signal.

3. The method according to claim 2, in which the predetermined fraction of the noise component is chosen so as to provide an amount of noise in the noise suppressed audio signal which naturally represents environmental background noise.

4. The method according to claim 1, in which the predetermined fraction of the noise component is chosen so as to provide an amount of noise in the noise suppressed audio signal that is below a perceptual masking limit of the speech component and so is not audible to a listener.

5. The method according to claim 1, in which the predetermined fraction of the noise component is chosen so as to provide an amount of noise in the noise suppressed audio signal that approaches a perceptual masking limit of the speech so that a predetermined amount of noise is left in the noise suppressed audio signal.

6. The method according to claim 1, in which the frequency domain estimate of the noise component is an estimate of power spectral density.

7. A noise suppressor for suppressing noise in an audio signal comprising a speech component and a noise component to provide a noise suppressed audio signal, the noise suppressor being configured to:

make a frequency domain estimate of the noise component and a frequency domain estimate of the speech component together with a predetermined fraction of the noise component;

use the estimates to generate a noise reducing filter having a frequency-dependent gain function to control a gain of the audio signal to suppress the noise component, wherein the apparatus is configured to make a first estimation of the frequency-dependent gain function adaptively and to use the first estimation to produce a noise estimation which is then used to produce a second estimation of the frequency-dependent gain function.

8. The noise suppressor according to claim 7, in which the predetermined fraction of the noise component chosen so as to provide a desired amount of noise in the noise suppressed audio signal.

9. The noise suppressor according to claim 8, in which the predetermined fraction of the noise component is chosen so as to provide an amount of noise in the noise suppressed audio signal which naturally represents environmental background noise.

10. The noise suppressor according to claim 7, in which the predetermined fraction of the noise component is chosen so as to provide an amount of noise in the noise suppressed audio signal that is below a perceptual masking limit of the speech component and so is not audible to a listener.

11. The noise suppressor according to claim 7, in which the predetermined fraction of the noise component is chosen so as to provide an amount of noise in the noise suppressed audio signal that approaches a perceptual masking limit of the speech so that a predetermined amount of noise is left in the noise suppressed audio signal.

12. The noise suppressor according to claim 7, in which the frequency-domain estimate of the noise component is an estimate of power spectral density.

13. A communications terminal comprising a noise suppressor for suppressing noise in an audio signal comprising a speech component and a noise component to provide a noise suppressed audio signal, the noise suppressor being configured to:

make a frequency-domain estimate of the noise component and a frequency-domain estimate of the speech component together with a predetermined fraction of the noise component;

use the estimates to generate a noise reducing filter having a frequency-dependent gain function to control a gain of the audio signal to suppress the noise component, wherein the apparatus is configured to make a first estimation of the frequency-dependent gain function adaptively and to use the first estimation to produce a noise estimation which is then used to produce a second estimation of the frequency-dependent gain function.

14. A communications network comprising a noise suppressor for suppressing noise in an audio signal comprising a speech component and a noise component to provide a noise suppressed audio signal, the noise suppressor being configured to:

make a frequency-domain estimate of the noise component and a frequency-domain estimate of the speech component together with a predetermined fraction of the noise component;

use the estimates to generate a noise reducing filter having a frequency-dependent gain function to control a gain of the audio signal to suppress the noise component, wherein the apparatus is configured to make a first estimation of the frequency-dependent gain function adaptively and to use the first estimation to produce a noise estimation which is then used to produce a second estimation of the frequency-dependent gain function.

15. A noise suppressor for suppressing noise in an audio signal comprising a speech component and a noise component to provide a noise suppressed audio signal, the noise suppressor comprising:

means for making a frequency-domain estimate of the noise component;

means for making a frequency-domain estimate of the speech component together with a predetermined fraction of the noise component;

means for using the estimates to generate a noise reducing filter having a frequency-dependent gain function to control a gain of the audio signal to suppress the noise component, wherein the apparatus is configured to make a first estimation of the frequency-dependent gain function adaptively and to use the first estimation to produce a noise estimation which is then used to produce a second estimation of the frequency-dependent gain function.

* * * * *

UNITED STATES PATENT AND TRADEMARK OFFICE

CERTIFICATE OF CORRECTION

PATENT NO. : 7,889,874 B1
APPLICATION NO. : 09/713524
DATED : February 15, 2011
INVENTOR(S) : Beghdad Ayad It is certified that error appears in the above-identified patent and that said Letters Patent is hereby corrected as shown below:

Column 14, Claim 8, Line 10, after "component" insert -- is --, therefor.

Signed and Sealed this
Seventeenth Day of May, 2011

David J. Kappos
*Director of the United States Patent and Trademark Office*